No. 675,876. Patented June 11, 1901.
J. C. ANDERSON.
MOTOR PASSENGER VEHICLE.
(Application filed Sept. 11, 1900.)
(No Model.) 4 Sheets—Sheet 1.
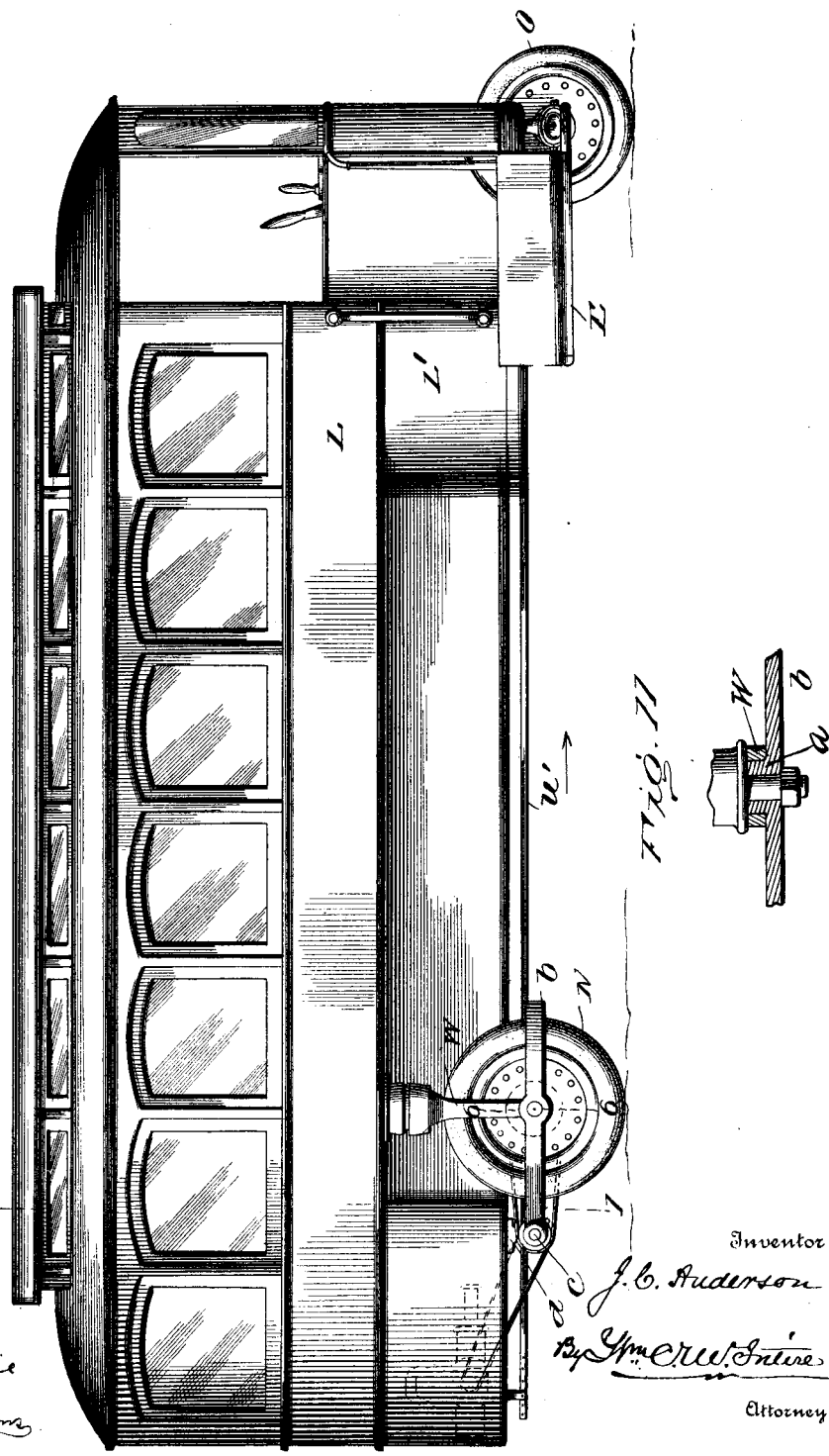

No. 675,876. Patented June 11, 1901.
J. C. ANDERSON.
MOTOR PASSENGER VEHICLE.
(Application filed Sept. 11, 1900.)
(No Model.) 4 Sheets—Sheet 2.
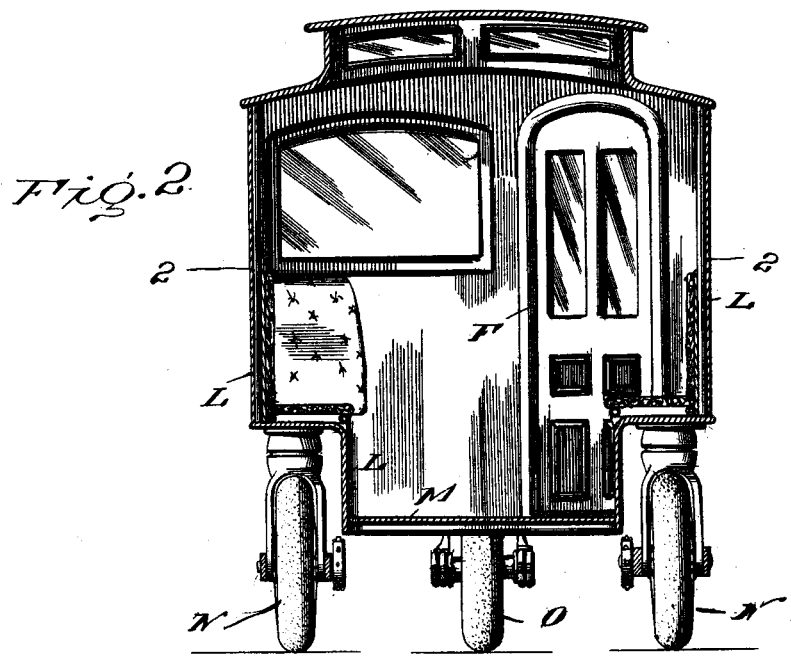
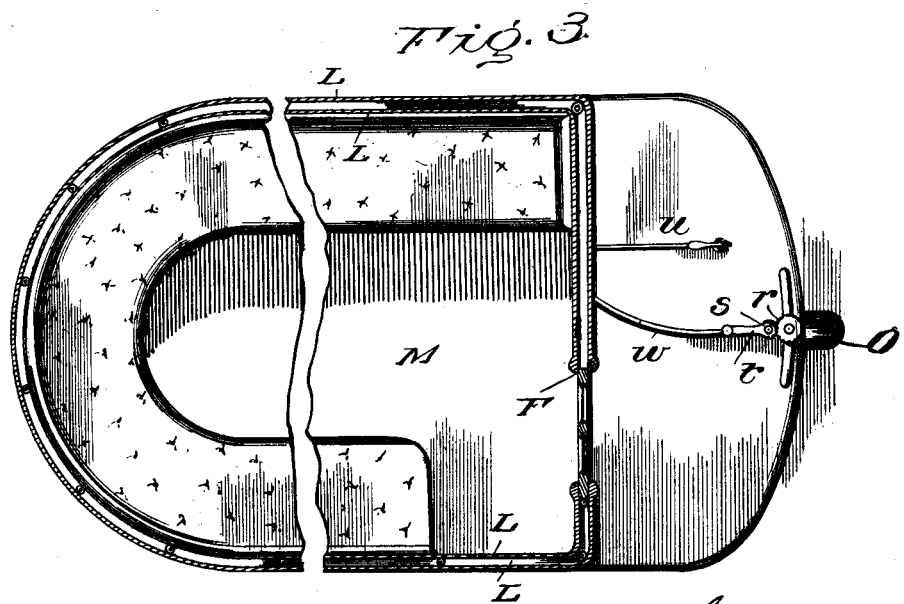
Witnesses
Inventor
J. C. Anderson

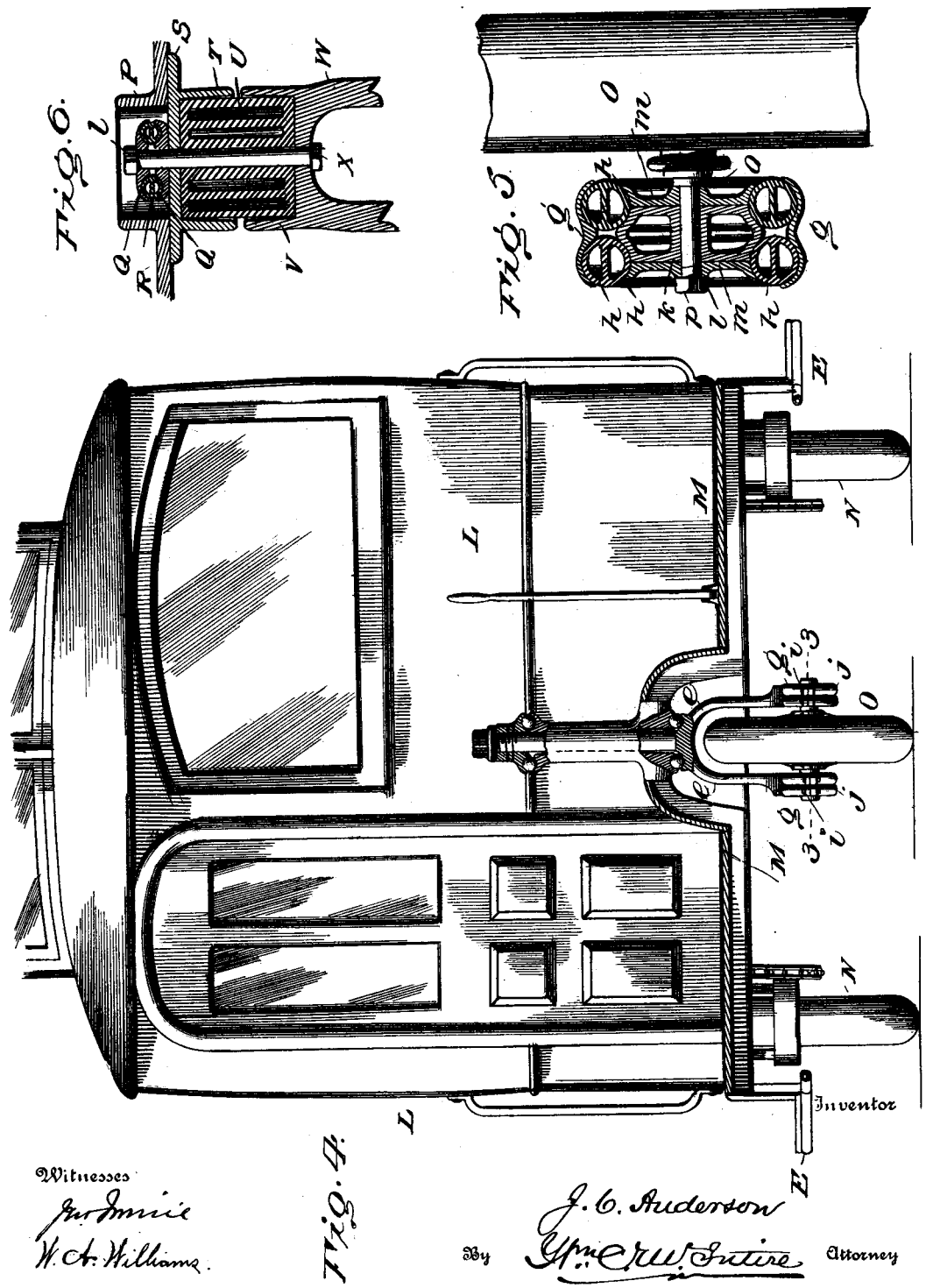

No. 675,876. Patented June 11, 1901.
J. C. ANDERSON.
MOTOR PASSENGER VEHICLE.
(Application filed Sept. 11, 1900.)
(No Model.) 4 Sheets—Sheet 4.
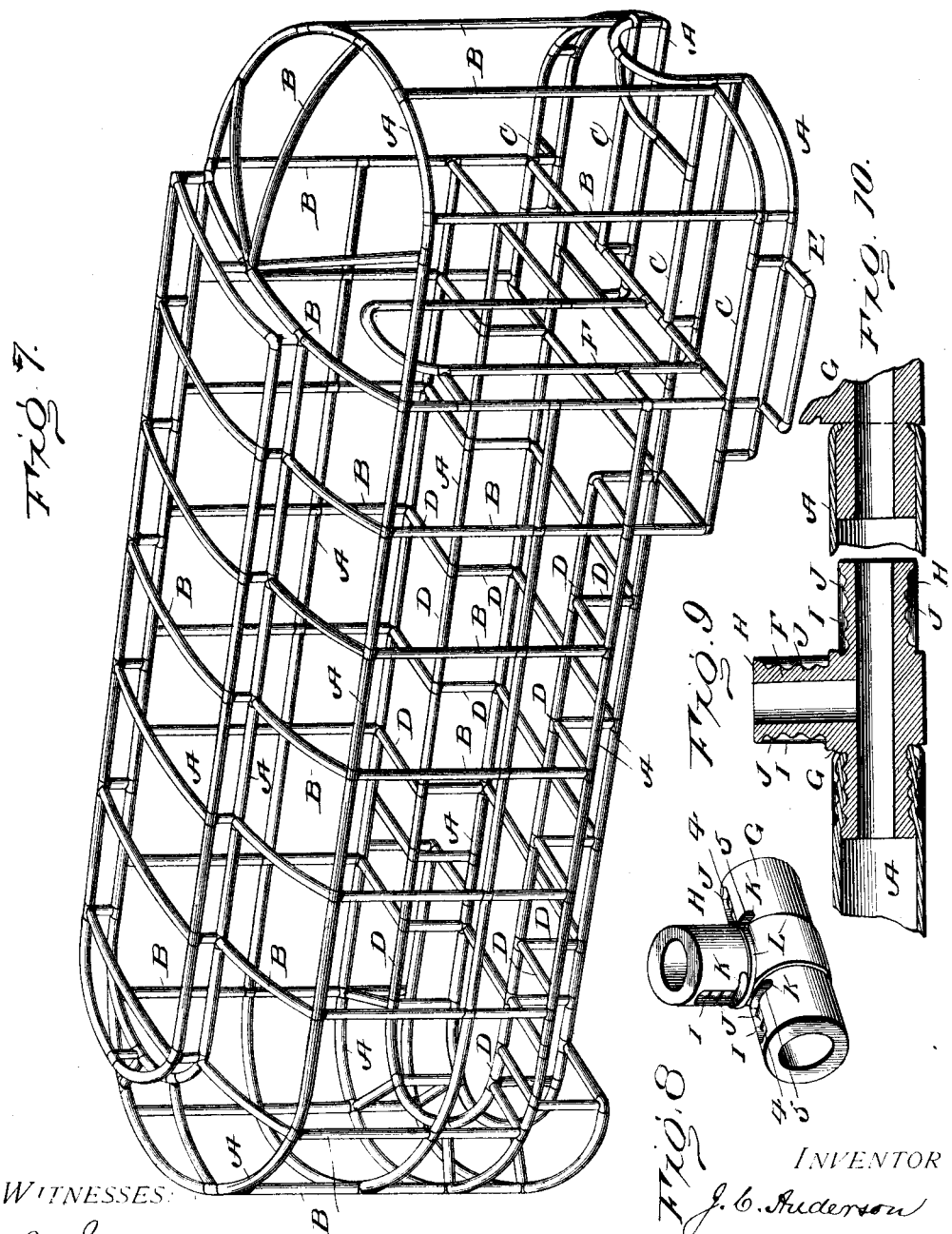
WITNESSES
INVENTOR
J. C. Anderson
BY
Attorney

UNITED STATES PATENT OFFICE.

JAMES C. ANDERSON, OF HIGHLAND PARK, ILLINOIS.

MOTOR PASSENGER-VEHICLE.

SPECIFICATION forming part of Letters Patent No. 675,876, dated June 11, 1901.

Application filed September 11, 1900. Serial No. 29,676. (No model.)

*To all whom it may concern:*

Be it known that I, JAMES C. ANDERSON, a citizen of the United States, residing at Highland Park, in the county of Lake and State of Illinois, have invented certain new and useful Improvements in Motor Passenger-Vehicles; and I do hereby declare the following to be a full, clear, and exact description of the invention, such as will enable others skilled in the art to which it appertains to make and use the same.

My invention relates to certain new and useful improvements in motor passenger-vehicles. In the present state of the art relating to this class of vehicles the construction has been such that the vehicle is not only weighty and cumbrous, and consequently requires powerful and expensive motive force to propel the same, but the vehicle has been difficult to keep in repair and is on account of its excessive weight injurious to the surface of the street. The excessive weight of the machine has been due to the fact that in order to secure the necessary strength to sustain the heavy machinery required for propulsion and the load for which the vehicle is designed the construction necessarily has been commensurately strong, and consequently weighty. Another disadvantage in the present construction rests in the fact that the entire weight of the vehicle and its operative machinery is carried, through the medium of the sustaining-springs, at such points with reference to the wheels that the load has a leverage action upon the wheels and axles and tends to consequent strain of the same, and the lateral vibration of the vehicle and its load is unduly extensive and accordingly disagreeable to the passengers. As a consequence of this general construction the larger proportion of the energy produced by the motor is expended in moving the dead-weight or vehicle itself, while only a minimum proportion is left over to carry the live load received into the vehicle, and it therefore follows that under such conditions motors and other machinery of excessive power and consequent weight are required.

My invention has for its especial object to so construct the vehicle as to overcome the enumerated disadvantages in this class of vehicles and to provide one which shall be light of construction, while at the same time sufficiently strong, of pleasing design, readily controlled in all of its movements, and one in which only the minimum proportion of the generated force is required to move the dead-weight, while the maximum proportion is reserved and utilized as occasion may require to carry the varying live load taken upon the vehicle.

My invention also has for its object to so construct and locate the springs that the load carried thereby is disposed immediately over the traction-face of the wheel and in a plane coincident with a central vertical plane across the axis of the wheel.

My invention also has for its object to so construct and locate the body of the vehicle with reference to the driving and steering wheels as to prevent to a very large extent lateral vibration of the body and at the same time render ingress and egress of passengers easy.

With these objects in view my invention consists in the general and detail features of construction hereinafter particularly described.

In order that those skilled in the art may know how to construct my improved vehicle and fully understand all the advantages of the same, I will proceed to describe the construction, referring by letters to the accompanying drawings, in which—

Figure 1 is a side elevation of one of my improved vehicles. Fig. 2 is a vertical cross-section on the line 1 1 of Fig. 1 and looking in the direction of the arrow, the skeleton frame omitted to avoid unnecessary confusion of lines. Fig. 3 is a horizontal section on the line 2 2 of Fig. 2. Fig. 4 is a front end view, on enlarged scale, showing the platform and mounting of the steering-wheel fork in section. Fig. 5 is a cross-section on the line 3 3 of Fig. 4, on increased scale, and with the axle and wheel in plan. Fig. 6 is a detail central vertical section, on large scale, of the head of the fork and spring mounted upon the axles and secured to the body of the vehicle. Fig. 7 is a perspective view of the pipe or skeleton frame of the vehicle. Fig. 8 is a perspective view illustrating the cast connections or fittings between the adjacent ends of the tubes constituting the frame. Fig. 9 is a longitudinal section on the line 4 4 of Fig. 8, with a tube connected to one end of the fitting. Fig. 10 is a similar section on the line 5 5 of Fig. 8; and Fig. 11 is a detail section, on enlarged scale, on the line 6 6 of Fig. 1, showing the wheel, box, axle, &c.

Similar letters indicate like parts in the several figures of the drawings.

The frame of the vehicle is composed of tubes, preferably of aluminium, on account of the lightness of the metal; but steel tubing may be employed. This frame consists of longitudinal tubes A, rib-tubes B, platform-tubes C, seat-frame tubes D, and step-tubes E, in such relation to one another as may be thought desirable and according to the design of the vehicle. In the design shown in the drawings the front and rear ends are curved and the front end is formed with a platform, and the step-frame E is one step below the platform-floor frame, so that only one step is made to the platform and thence direct to the interior of the car through the door F. All joints between the several sections of tubes are made through the connections or fittings shown in perspective at Fig. 8 and which consist of short tubular castings G, with or without the tubular stems H, according as said fitting is to be used to connect two or three or four sections, respectively, of tubing. These castings are of thicker gage than the tubing in order to secure the greatest degree of strength, and are formed at one or more localities with a longitudinal depression or pocket I, having transverse ribs or corrugations J and a recess K. The fittings G H are formed with raised rings or bands of a thickness equal to the gage of the metal of which the tubes are formed, so that when in position the exposed portions of the fitting will be flush with the exterior surface of the tubes and also constitute annular shoulders to receive the thrust of the tube ends.

In making the connections between the various sections of the tubular frame the ends of the tube-sections are slipped over the ends of the fitting, as clearly shown at Fig. 9, and by the use of a suitable hand-screw press or similar tool the body of the ends of the tubing is forced down into the pockets I and corrugations J, and a portion of the extreme end of the tube is turned down into the recess K, as clearly shown. By reason of the depth of the pockets I and the area of the corrugation-surface the ends of the tubes where they are pressed into coincidence with the corrugations necessarily draw upon the adjacent body of the tube to compensate for the increased area of the corrugations, and consequently this results in drawing the body of the tube tightly against the cylindrical body of the fitting and to such an extent as to make an exceedingly-firm juncture between the parts. This construction of the fitting and the manner of connecting the ends of the tube-sections thereto renders all brazing or welding unnecessary and avoids the requirement of any screw-threads. With this manner of connecting the adjacent ends of the tubing it will readily be seen that the body or skeleton frame may be made of any desired proportions, as well as form or design, and that it will be impossible for the tube-sections to move or change their relation with the fittings, and hence the integrity of the whole structure will be thoroughly maintained.

A covering or skin L, of wood or any other desired material, is secured to the interior and exterior of the skeleton by any suitable means—such as clips, screws, or otherwise—and in a suitable manner a seat may be secured to the seat-frame, and likewise a flooring M may be secured in position.

Window-frames and windows and ventilators of ordinary construction are located in the covering or skin L, as most clearly shown at Fig. 1.

The rear end of the frame is dropped down below the plane of the floor of the vehicle to provide a space within which is secured and concealed any suitable motor, preferably such as shown and described in an application for Letters Patent filed by me the 6th day of September, 1900, Serial No. 29,189, illustrated by broken lines. The front end of the frame is curved outwardly, as shown at L′, to give free access from the platform through the door F and at the same time make the design symmetrical.

N N are the driving-wheels under the rear end of the vehicle, and O is a single centrally-disposed steering-wheel.

By reference to Fig. 2 it will be seen that the body of the vehicle is of such form in cross-section that the rear driving-wheel may be disposed in a vertical plane immediately under the longitudinal seats and that the floor of the vehicle is in a horizontal plane slightly above the axes of the wheels.

The body immediately over the wheels N is formed with a pocket P (see Fig. 6) to receive a counteracting spring composed of two confining-plates Q Q and an interposed tubular ring-shaped pneumatic spring R. This spring is sustained upon a plate S, secured to the under side of the floor-frame and formed with an annular flange T to receive the upper end of a pneumatic spring U, the lower end of which is located within an annular flange V at the upper end of wheel-fork W. The several parts just described when assembled are held in proper relation by a centrally-arranged bolt X and nut Z.

The wheel-forks W are supported pivotally upon boxes a, formed with the horizontal forks b, and said boxes constitute the journal-bearings for the axles of the wheels N and may be provided with any suitable lubricating-boxes for furnishing lubricant to the axles. It will of course be understood that the axles may be connected with the boxes by ball-bearings in any well-known manner, if preferred. The rear ends of the horizontal forks *b* are vibratively connected at *c* to a suitable hanger-bracket *d*, rigidly secured to the under side of the vehicle, and a double sprocket-wheel may be arranged to rotate upon the pivotal bearing *c*, if it is desired to transmit power from the motor in that way, and, as indicated at Fig. 1, to the sprocket fixed to the axle of the driving-wheel N, instead of transmitting power direct from the motor to the wheel-axle sprocket. From this construction and arrangement it will be seen that the load is carried upon the wheel-axle and on each side of the wheel and that the spring U takes up the momentum shock, while the counteracting spring R yieldingly retards any sudden or extensive upward or return movement of the vehicle-body, and thus avoids the usual and unnecessary violent spring action.

The forward and single steering-wheel O is mounted in a steering-fork *e*, the head of which is secured in any suitable manner to the tubular or skeleton frame of the vehicle and provided with ball-bearings *f*, all as shown at Fig. 4. The lower ends of the forks *e* are formed with semicircular pockets *g* for the reception of pneumatic ring-springs *h*, (see Fig. 5,) and these pockets or terminal ends of the fork are formed with lugs *i*, which are secured by bolts to corresponding lugs on semicircular removable castings *j*, formed with pockets corresponding to those in the terminals *g* of the fork and to complete the exterior bearing-surface for the springs *h*.

A centrally-arranged spring bearing or hub *k*, formed with seats for the inner surface of the springs *h*, is formed with a central bearing for the axle *l* of the wheel O, and *m m* are two disk-plates formed with circumferential flanges *n*, which coöperate with the hub *k* in supporting and confining the ring-springs *h*, when the said disk-plates are secured in position on the end of the axle between a suitable shoulder *o* and nut *p*, as clearly shown at Fig. 5. The axle in this case is rendered stationary by the clamping of the plates *m m;* but if deemed necessary any auxiliary means may be employed to secure a fixed relation between the axle and the fork *e*. The wheel O is mounted rotatively upon the axle *l*, upon ball-bearings or otherwise, in any well-known manner. The upper end or head of the fork *e* is provided with a fixed cog wheel or segment *r*, adapted to mesh with corresponding cogs *s* on the end of the lever *t*, pivoted in any suitable manner to the frame and within easy reach of the motorman, as clearly shown at Fig. 3.

*u* is a lever which through the medium of a rod *v* controls the motor, and any suitable foot or other brake may be provided.

*w* is a guard rail or pipe designed and located to separate the space occupied by the motorman from the passage-way on the platform and leading to the door of the vehicle. This construction and arrangement, as will be readily seen, fully protects the motorman from interference by the passengers. The passengers cannot enter or leave the vehicle without being observed by the motorman, and hence the possibility of accident is avoided.

From the foregoing description and the illustrations in the drawings it will be seen that my improved vehicle is exceedingly strong and at the same time comparatively light, that by reason of such construction I am enabled to dispense with all of the usual cumbrous and heavy running-gear frame and spring devices, and that by reason of the character of my spring devices and the relation between the body, springs, and wheels and the fact that the load is sustained upon the axles equidistant from the center of the wheels there is no leverage strain exerted upon the axles, and therefore they may be made much lighter than would be required where the weight of the vehicle and its load is disposed between the inner faces of the wheels. It will also be seen that as a consequence of the manner in which I locate the wheels and the springs with reference to the frame or body I am enabled to bring the floor of the vehicle very low to the ground, which not only decreases the lateral vibration of the body, but renders ingress and egress exceedingly easy.

By reference to Fig. 3 it will be seen that the motorman's position, while entirely out of the path of the passengers as they enter or leave the vehicle, enables him to closely guard their movements and to protect them from danger.

Many changes may be made in mere details of construction without departing from my invention. For instance, while I have shown and prefer to mount the driving-wheels upon independent short axles a single axle may be used and the wheels mounted at each end thereof; but in both cases the body is to be supported upon springs and connections immediately over the tread of the wheels, so that the weight will be sustained at points each side of the wheels, as already fully explained.

The particular connections or fittings employed in joining the tube-sections of the frame enable me to utilize aluminium, steel, or other tubes, which could not be the case if ordinary pipe connections or joints were used, because it would be impossible in such a structure as I have shown at Fig. 7 to either weld or braze the joints or secure them by screw-threads, and were such joints possible the time required would render them prohibitive.

Having described the construction and advantages of my improved automobile vehicle, what I claim as new, and desire to secure by Letters Patent, is—

1. A vehicle the body of which is composed of a skeleton of tube-sections, the adjacent ends of which are connected by compression upon pocketed and corrugated fittings, and a skin or coating of suitable material secured in position upon the tube skeleton, substantially as and for the purposes set forth.

2. In a vehicle, the body extended laterally beyond the floor, carrying-wheels located beneath the lateral extensions, vertical forks supported upon the wheel-axles each side of the hubs, and springs interposed between the forks and the body and diametrically over the tread of the wheel, substantially as and for the purposes set forth.

3. In a vehicle, the body extended laterally beyond the floor, the floor occupying a plane below the laterally-extended body, carrying-wheels located beneath the lateral extensions, vertical forks supported upon the axles of the wheels, each side of the hubs, and springs interposed between the forks and the body and diametrically over the tread of the wheels, substantially as and for the purposes set forth.

4. In a vehicle, the body extended laterally beyond the floor, carrying-wheels located beneath the lateral extensions, vertical forks supported upon the wheel-axles each side of the hubs, springs arranged diametrically over the tread of the wheels, and between the upper end of the forks and the car-body, and a steering-wheel centrally located at the forward end of the vehicle rotatively mounted upon an axle, rigidly secured at each end within springs, said springs located in the lower ends of a steering-fork, substantially as and for the purposes set forth.

5. In a vehicle mounted upon carrying and steering wheels, forks arranged upon the axles of the carrying-wheels and supported each side of the hubs upon the axles, and springs disposed diametrically over the wheels, and between the forks, and the body of the vehicle, substantially as and for the purposes set forth.

6. In a vehicle, the steering-wheel rotatively mounted upon an axle, the axle at each end centrally and fixedly connected with springs located in suitable bearings in a fork, the latter embracing the wheel and rotatively connected with the body of the vehicle, substantially as and for the purposes set forth.

7. In a motor-vehicle mounted upon rear carrying-wheels, and a single centrally-disposed forward steering-wheel, a forward platform provided with a step on one side, a door or entrance through the front end of the car on one side of the longitudinal center, and a seat extending longitudinally along one side of the car, around the rear end and terminating on the opposite side of the car a predetermined distance from the front end, whereby ingress and egress is made at the front end and under the surveilance of the motorman, substantially as described.

8. In a vehicle mounted upon suitable carrying and steering wheels, and provided with springs interposed between the body and wheels, auxiliary springs located above the floor of the vehicle and vertically connected with the main or primary springs whereby the body is prevented from sudden or violent movement away from the primary springs, substantially as hereinbefore set forth.

9. In combination with the body mounted upon carrying-wheels, supported in forks, springs interposed between the upper ends of the forks, and the under side of the body, springs arranged above the floor and over the primary springs, and a connecting tie rod or bolt passing vertically through the springs, substantially as and for the purposes set forth.

10. The forward steering-wheel axle mounted in a fork, formed at its lower ends with semicircular spring bearings or pockets, $g$, in combination with the removable castings $j$, ring-shaped springs, $h$, hub $k$, flanged plates $m$, and clamping-nut $p$, substantially as and for the purposes set forth.

11. In combination with the steering wheel and axle, and the body of the vehicle, a steering-fork, and a multiplicity of ring-shaped springs surrounding each end of the axle, and interposed between the same and the lower bearing-surfaces of the fork, substantially as and for the purposes set forth.

12. In a vehicle such as described the rear or driving wheels fixed to their axles mounted in boxes or bearings formed integral with horizontal forks, $b$, vibratively connected with the body, in combination with forks, W, mounted vibratively upon the axle-boxes, and connected with the body through the medium of springs arranged diametrically over the wheel, substantially as hereinbefore set forth.

In testimony whereof I affix my signature in presence of two witnesses.

JAMES C. ANDERSON.

Witnesses:
WM. C. MCINTIRE,
GEO. E. FRECH.